INVENTOR.
WALTER M. POSINGIES

BY Ronald T. Reiling

ATTORNEY

United States Patent Office 3,610,049
Patented Oct. 5, 1971

1

3,610,049
FLUID VORTEX DEVICE
Walter M. Posingies, Edina, Minn., assignor to
Honeywell Inc., Minneapolis, Minn.
Filed Oct. 14, 1969, Ser. No. 866,309
Int. Cl. G01p 3/26
U.S. Cl. 73—505                    10 Claims

ABSTRACT OF THE DISCLOSURE

Fluid vortex apparatus including a vortex chamber, a characterized coupling element for introducing fluid into the vortex chamber at its periphery, and a central fluid outlet. The coupling element is characterized so that different portions of the fluid are introduced into the vortex chamber at different distances from the outlet, and are thus subject to different transfer characteristics in traversing the vortex chamber. A sensor in the outlet passage produces a signal indicative of a summation of the modifications to rotational velocity of flow about the axis of the outlet, thereby resulting in a characterized response to input stimuli.

BACKGROUND OF THE INVENTION

This invention pertains to fluid vortex apparatus, and more particularly, to coupling means for vortex rate sensing instruments.

A vortex rate sensor is a fluidic device which is sensitive to changes in angular velocity (rate of turn) about an axis. It contains no essential moving structural parts. Change in angular velocity of a vortex rate sensor about its sensitive axis results in modification of a fluid flow field therewithin which is then sensed to provide a rate signal.

Structurally, a vortex rate sensor generally comprises housing means enclosing a chamber having a central axis and a fluid outlet from the chamber extending along the axis. Fluid permeable coupling means is provided at the periphery of the chamber for introducing fluid thereinto so that it has substantially no rotational velocity about the axis relative to the housing. A flow sensor is associated with the fluid outlet. The flow sensor provides a signal indicative of rotational velocity of fluid in the outlet relative to the housing.

In operation, a fluid source provides fluid flow into the vortex chamber through the coupling means. In the absence of a rate input to the sensor, fluid flow through the vortex chamber approximates two dimensional pure sink flow. Such fluid flow has no angular velocity about the sensor axis relative to the sensor housing. When the sensor is subjected to a rate input about its sensitive axis, the coupling element functions to produce the same angular velocity in the fluid flowing therethrough. Since there is relatively little couplnig between the housing and the fluid within the vortex chamber, the fluid takes on an angular velocity relative to the housing after leaving the coupling means. The angular velocity is superimposed on the radial velocity and a spiral fluid flow field is produced. Due to the principle of conservation of angular momentum, the rotational flow velocity increases as the fluid approaches the central outlet.

A flow sensor or signal pickoff associated with the fluid outlet produces a signal indicative of the rotational velocity of fluid flowing therethrough. Since the rotational velocity of fluid flowing through the outlet varies with rate input to the vortex rate sensor about its sensitive axis, the signal from the pickoff also varies with the rate input.

Rate signals are required in all aircraft flight control systems, as well as in many other applications. Due to the inherent simplicity and potential for ruggedness, reliability and low cost of fluidic devices, vortex rate sensors have found frequent applications in control systems, particularly where extreme environments are encountered. A control system requiring a rate signal frequently requires a signal indicative of some predetermined characterized function of pure rate. For example, certain aircraft flight control systems have been found to require a signal indicative of rate plus lagged rate about an axis. In many cases, the desired predetermined function of rate cannot be produced by a conventional prior art vortex rate sensor alone for the following reasons.

In a prior art vortex rate sensor, assuming that there is no coupling between the sensor housing and the fluid within the vortex chamber after it leaves the coupling means, amplification of the angular velocity of the fluid is substantially only dependent on the difference in diameters of the coupling means and the fluid outlet. Consequently, a vortex device can be said to have a gain which is dependent on the difference in these diameters.

Another characteristic of a vortex device is its time response. Since fluid entering the vortex chamber from the coupling means and ay fluid in the chamber require finite times to pass from the chamber to the signal pickoff, the effect of a rate input will not be immediately apparent at the pickoff. Further, the full effect of a rate input will not be apparent at the kickoff until time sufficient for fluid entering the vortex chamber from the coupling means to reach the pickoff has elapsed. Thus, the time response of a vortex device is dependent on the transit time required for fluid to pass from the coupling means to the signal pickoff. The transit time is bascially dependent on the diameter of the coupling means and the radial velocity at which fluid enters the vortex chamber. The radial velocity is dependent on the pressure differential across the device and the impedance to fluid flow offered by the coupling means, assuming all other flow impedances to be negligible.

Accordingly, every vortex device has associated therewith a signal transfer characteristic, comprising a gain factor and a time response factor, which is basically dependent on the device configuration. It will also be noted that both the gain and the time response are basically dependent on the geometry (particularly diameter) of the vortex chamber. Since the gain and time response of a given prior art device cannot be varied independently, the latitude in varying the transfer characteristic of such a device is limited.

One prior art solution to the problem of generating signals indicative of particular rate functions, such as angular rate plus lagged angular rate, has been to process a pure rate signal, such as can be generated by a prior art vortex rate sensor, in a signal shaping network. However, this approach is undesirable since it requires the use of a signal shaping network in addition to the basic rate sensor. Accordingly, the advantages of a vortex rate sensor having the capability of producing any one of a wide range of rate functions is readily apparent.

SUMMARY OF THE INVENTION

The applicant's invention is a vortex device capable of sensing angular rate and producing a signal indicative of any one of a wide range of functions of that angular rate. Apparatus according to the applicant's invention comprises a housing enclosing a vortex chamber having a central axis and a fluid outlet from the vortex chamber. Fluid permeable coupling means is provided for introducing fluid into the vortex chamber so that it has substantially no rotational velocity relative to the housing. The coupling means is further characterized so that portions of the fluid introduced into the vortex chamber are affected by substantially different transfer characteristics in passing through the coupling means and chamber to the fluid outlet. Sensing means is also provided for producing a signal indicative of a summation of the rotational velocities of the fluid relative to the housing, such velocities being acquired by portions of the fluid in response to input stimuli.

The coupling means may be characterized by a particular contour extending over a range of diameters. Alternately, the coupling means may be characterized by inhomogeneous permeability which varies in some particular pattern. Finally, the coupling means may be characterized by both a particular contour and a particular pattern of permeability.

DESCRIPTION OF THE PREFERRED EMBODIMENT

Figure 1:
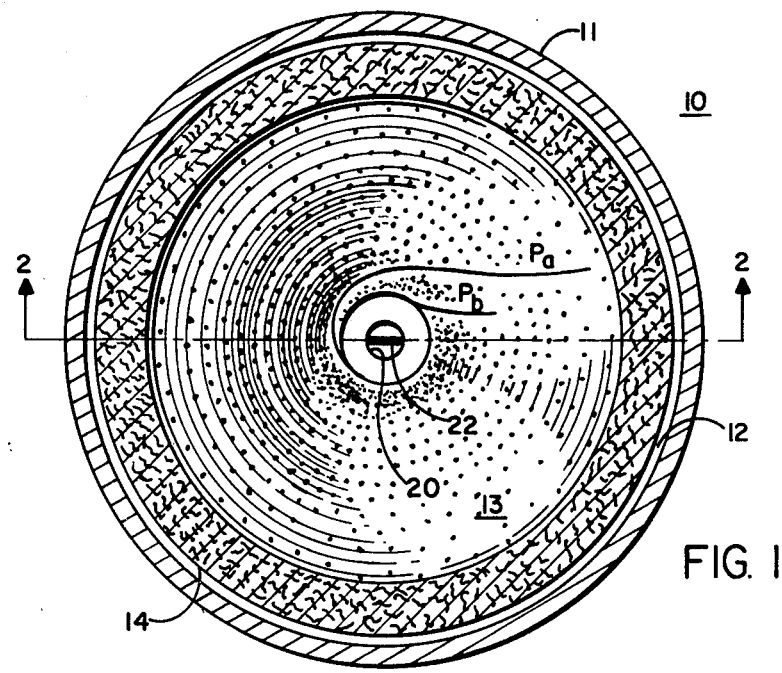
FIG. 1 is a sectional plan view taken along lines 1—1 in FIG. 2 of a vortex device in accordance with the applicant's invention, having a contoured coupling element of inhomogeneous permeability.
Figure 2:
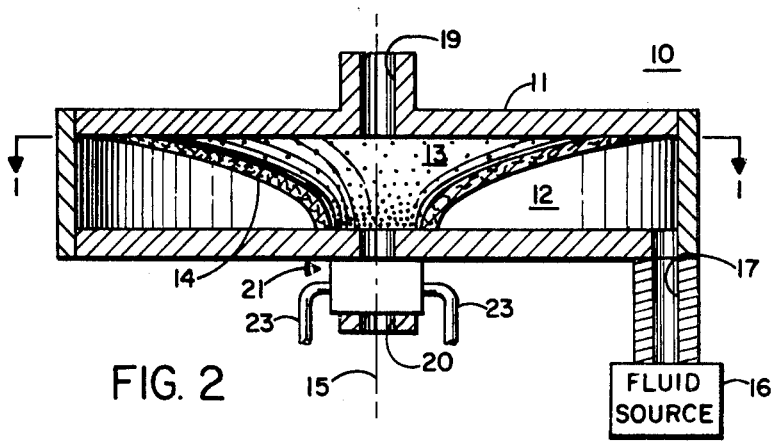
FIG. 2 is a sectional view of the embodiment of the applicant's invention shown in FIG. 1 taken along lines 2—2.

In FIGS. 1 and 2, reference numeral 10 generally identifies vortex rate sensing apparatus in accordance with the applicant's invention. Sensor 10 comprises a housing 11 enclosing a supply plenum 12 and a vortex chamber 13. Supply plenum 12 and vortex chamber 13 are separated by a fluid permeable coupling element 14 which will hereinafter be described in greater detail. The periphery of vortex chamber 13 is defined by the inner surface of coupling element 14. Vortex chamber 13 is shown symmetrical about a central axis 15, and is shown as having circular cross sections in planes perpendicular to axis 15.

Plenum 12 is supplied with fluid from a source 16 through an inlet passage 17. Vortex chamber 13 is shown provided with a pair of fluid outlets 19 and 20 extending along axis 15. A signal pickoff 21 is associated with fluid outlet 20. Signal pickoff 21 senses the fluid flow pattern within outlet 20 and produces a signal indicative of the rotational component of flow about axis 15 relative to housing 11.

Signal pickoff 21 may be of any one of a number of well known types of pickoffs utilized with vortex devices. The pickoff illustrated comprises a blade member 22 extending at least partially across outlet 20 and oriented so that a chord thereof is aligned with axis 15. A plurality of pressure ports (not shown) are associated with blade member 22, and are connected to any suitable utilization apparatus through conduits 23. In operation, pressure signals indicative of the angle of attack of fluid on blade member 22, and hence indicative of the rotational velocity of fluid in passage 20, are produced in conduits 23. Thus, the pressures in conduits 23 are indicative of rate input to sensor 10.

In operation, a pressure differential exists between supply passage 17 and fluid outlets 19 and 20. Thus, fluid flows through coupling element 14 and vortex chamber 13 to outlets 19 and 20. In the absence of any change in angular velocity of sensor 10 about axis 15, fluid flow through vortex chamber 13 is substantially entirely radial and approximates two dimensional pure sink flow. If the angular velocity of sensor 10 about axis 15 is varied, a rotational component of flow relative to housing 11 is impressed on the fluid flowing through vortex chamber 13. Under such conditions, fluid flow through chamber 13 has superimposed radial and rotational components, and the fluid follows spiral flow paths from the coupling element to the fluid outlets. As a result of the requirement for conservation of angular momentum, the rotational flow velocity increases as the fluid approaches the outlets. Specifically, the rotational flow velocity varies inversely with distance from the outlet.

To facilitate describing the overall operation of the applicant's invention, sensor 10 can be visualized as comprising an infinite number of hypothetical conventional vortex devices, each connected to supply its output signal to a common fluid outlet and signal pickoff. Further, each of these hypothetical sensors can be considered to lie in a plane perpendicular to axis 15. The sensor lying in any given plane has a vortex chamber of a given diameter, namely the diameter of the inner surface of coupling element 14 at its intersection with the plane in question. Each of these hypothetical sensors has its own associated signal transfer characteristic including a gain factor and a time response factor. The gains associated with the individual hypothetical sensors increase as the diameters of the sensors increase. In addition, the time lags provided by the individual hypothetical sensors increase as the sensor diameters increase. Accordingly, the transfer characteristic of an actual vortex rate sensor can be tailored by combining the proper number of hypothetical devices of each characteristic.

For example, it may be desired that upon application of a step rate input, the output signal will rapidly rise to a substantial percentage of its final value, and then gradually increase until the final value is reached. Such a response is characteristic of the rate plus lagged rate signal previously mentioned in connection with aircraft flight control systems. A vortex rate sensor having such a response can be provided by utilizing a coupling element which is characterized so as to simulate a large number of small diameter, fast response, low gain sensors and a smaller number of larger diameter, lower response, higher gain sensors. To accomplish this, a major portion of the coupling element is of a relatively small diameter, and smaller portions thereof of increasing diameters as shown in FIGS. 1 and 2. This general design may be viewed as embodying a plurality of hypothetical sensors operating in parallel.

In accordance with the foregoing discussion, different portions of the fluid flowing through sensor 10 are affected by different transfer characteristics before reaching fluid outlets 19 and 20. Specifically, portions of fluid flowing through the larger diameter portions of coupling element 14 acquire large rotational velocities about axis 15 relative to housing 11 before reaching fluid outlets 19 and 20. However, the same portions of the fluid require a relatively long period of time to reach outlets 19 and 20 so that this large rotational velocity is not present at signal pickoff 21 for a relatively long time after the input stimulus from which it resulted. Conversely, the portions of fluid flowing through the smaller diameter portions of coupling element 14 acquire relatively small rotational velocities in response to a rate input, but the effect therefrom is present at pickoff 21 after a very short lapse of time.

It is also pointed out that the previously described operation results in different portions of the fluid following different paths from coupling element 14 to fluid outlets 19 and 20. Specifically, the larger the radius at which the fluid enters vortex chamber 13, the greater the rotational component acquired by the fluid while in chamber 13. This is indicated in FIG. 1 by flow path $P_a$ which illustrates the path taken by fluid entering chamber 13 at a relatively large diameter, and flow path $P_b$ which illustrates the flow path of fluid entering chamber 13 at a smaller diameter. While taking different paths from coupling element 14 to fluid outlets 19 and 20, the portions of fluid following the different paths are affected by different transfer characteristics. Further, due to the different transfer characteristics acting on the different portions of fluid within chamber 13, the paths followed by different portions of the fluid are differently modified in response to rate inputs.

The applicant has also discovered that the different effects produced in different portions of the fluid as the result of an input rate are integrated or summed at signal pickoff 21 so that the signal produced thereby is indicative of a summation of the modifications to the flow paths followed by different portions of the fluid. Thus, the signal produced by pickoff 21 is indicative of the composite effects produced by sensor 10 on individual portions of the fluid flowing therethrough, and is indicative of a particular function of the rate input imposed on sensor 10.

As alternate method of characterizing coupling element 14 so as to vary the amounts of fluid flowing into chamber 13 at various radii, and so as to vary the relative amounts of fluid following particular flow paths to fluid outlets 19 and 20 is to vary the fluid permeability of the coupling element. In the embodiment shown in FIGS. 1 and 2, the smaller diameter portions of coupling element 14 are represented as being of greater permeability. Accordingly, a larger portion of the fluid flows through the smaller diameter portions of the coupling element, and a larger portion of the fluid follows flow paths similar to path $P_b$ in FIG. 1.

In accordance with the foregoing description, it can be seen that the application has disclosed simple fluidic means for sensing angular rate about an axis and providing a signal indicative of a predetermined function of the angular rate. Further, this method has inherent versatility since the particular function can be varied as desired over a wide range by appropriately characterizing the coupling element. Although one specific embodiment is shown in detail, this embodiment is only exemplary. A variety of other structural embodiments in accordance with the applicant's contemplation and teaching will be apparent to those skilled in the art.

What is claimed is:

1. Fluid vortex apparatus comprising:
    housing means defining a plenum chamber having a fluid inlet, a vortex chamber having a central axis, and a fluid outlet from the vortex chamber;
    coupling means permeable to fluids separating the plenum chamber from the vortex chamber, said coupling means for introducing fluid into the vortex chamber so that it has substantially no rotational velocity about the axis relative to said housing means, said coupling means further for introducing fluid into the vortex chamber over a substantial continuous range of radii with respect to the axis so that portions of the fluid are affected by substantially different transfer characteristics in passing through said coupling element and the vortex chamber to the fluid outlet, fluid in the vortex chamber acquiring a rotational velocity relative to said housing means in response to changes in rotation of said housing means about the axis; and
    sensing means operable to produce a signal indicative of the rotational velocity of the fluid in the outlet about the axis, the rotational velocity of the fluid in the outlet being indicative of a summation of the rotational velocities acquired by the portions of the fluid while in the vortex chamber.

2. The vortex apparatus of claim 1 wherein said coupling means is characterized by having permeability to fluids which varies as a function of a dimension thereof.

3. The vortex apparatus of claim 2 wherein the permeability of said coupling means varies as a function of its dimension parallel with the axis.

4. In a fluid vortex device:
    a housing enclosing a chamber having a central axis;
    outlet means for discharging fluid from the chamber along the axis;
    a fluid permeable coupling member separating said housing into a vortex chamber in communication with said outlet means, and a second portion comprising a plenum chamber;
    inlet means for admitting fluid into the plenum chamber so that different portions of fluid traversing said coupling member follow different paths to said outlet means, said coupling member having a substantial dimension parallel with the axis and having different dimensions in different planes perpendicular to the axis so that portions of fluid following different paths are differently modified in traversing said coupling member and the vortex chamber in said housing when the rotation of said housing about the axis is varied; and
    sensing means operable to produce a signal indicative of a summation of the modifications to the paths followed by different portions of the fluid flowing through the vortex chamber.

5. The vortex device of claim 4 wherein said coupling member is characterized by having permeability to fluids which varies as a function of a dimension thereof.

6. The vortex device of claim 5 wherein the permeability of said coupling member varies as a function of its dimension parallel with the axis.

7. In a fluid vortex device including a housing defining a plenum chamber having a fluid inlet, a vortex chamber having a central axis, a fluid outlet from the vortex chamber, and sensing means associated with the fluid outlet, said sensing means operable to produce a signal indicative of rotational velocity of fluid in the fluid outlet about the axis, the improvement which comprises:
    fluid permeable coupling means separating the plenum chamber from the vortex chamber, said coupling means for introducing fluid into the vortex chamber so that it has substantially no rotational velocity relative to the housing means, said coupling means having an annular configuration about the axis whose diameter differs in different planes perpendicular to the axis for introducing different portions of fluid from the plenum chamber into the vortex chamber at substantially different radii, thereby causing the different fluid portions to be affected by different transfer characteristics in passing through the vortex chamber.

8. The fluid vortex device of claim 7 wherein said coupling member is characterized by having permeability to fluids which varies as a function of a dimension thereof.

9. The fluid vortex device of claim 8 wherein the permeability of said coupling member varies as a function of its dimension parallel with the axis.

10. The vortex apparatus of claim 1 wherein said coupling means is further configured for introducing fluid into the vortex chamber over a range of locations extending between a pair of spaced planes perpendicular to the axis.

References Cited

UNITED STATES PATENTS

| | | | |
|---|---|---|---|
| 3,276,259 | 10/1966 | Bowles et al. | 73—194 |
| 3,320,815 | 5/1967 | Bowles | 73—505 |

JAMES J. GILL, Primary Examiner